Nov. 22, 1966 JAMES E. WEBB 3,287,725
ADMINISTRATOR OF THE NATIONAL AERONAUTICS
AND SPACE ADMINISTRATION
PHASE-LOCKED LOOP WITH SIDEBAND REJECTING PROPERTIES
Filed June 1, 1964 2 Sheets-Sheet 1

INVENTORS
DONALD W. BROWN
MAHLON EASTERLING
WARREN L. MARTIN
EDWARD C. POSNER
BY G. T. McCoy
ATTORNEY

Nov. 22, 1966 JAMES E. WEBB 3,287,725
ADMINISTRATOR OF THE NATIONAL AERONAUTICS
AND SPACE ADMINISTRATION
PHASE-LOCKED LOOP WITH SIDEBAND REJECTING PROPERTIES
Filed June 1, 1964 2 Sheets-Sheet 2

INVENTORS
DONALD W. BROWN
MAHLON EASTERLING
WARREN L. MARTIN
EDWARD C. POSNER
BY G. H. McCoy
ATTORNEY

United States Patent Office 3,287,725

Patented Nov. 22, 1966

3,287,725

PHASE-LOCKED LOOP WITH SIDEBAND REJECTING PROPERTIES

James E. Webb, Administrator of the National Aeronautics and Space Administration with respect to an invention of Donald W. Brown, Mahlon Easterling, Warren L. Martin, and Edward C. Posner

Filed June 1, 1964, Ser. No. 371,857
12 Claims. (Cl. 343—14)

Figure 1:
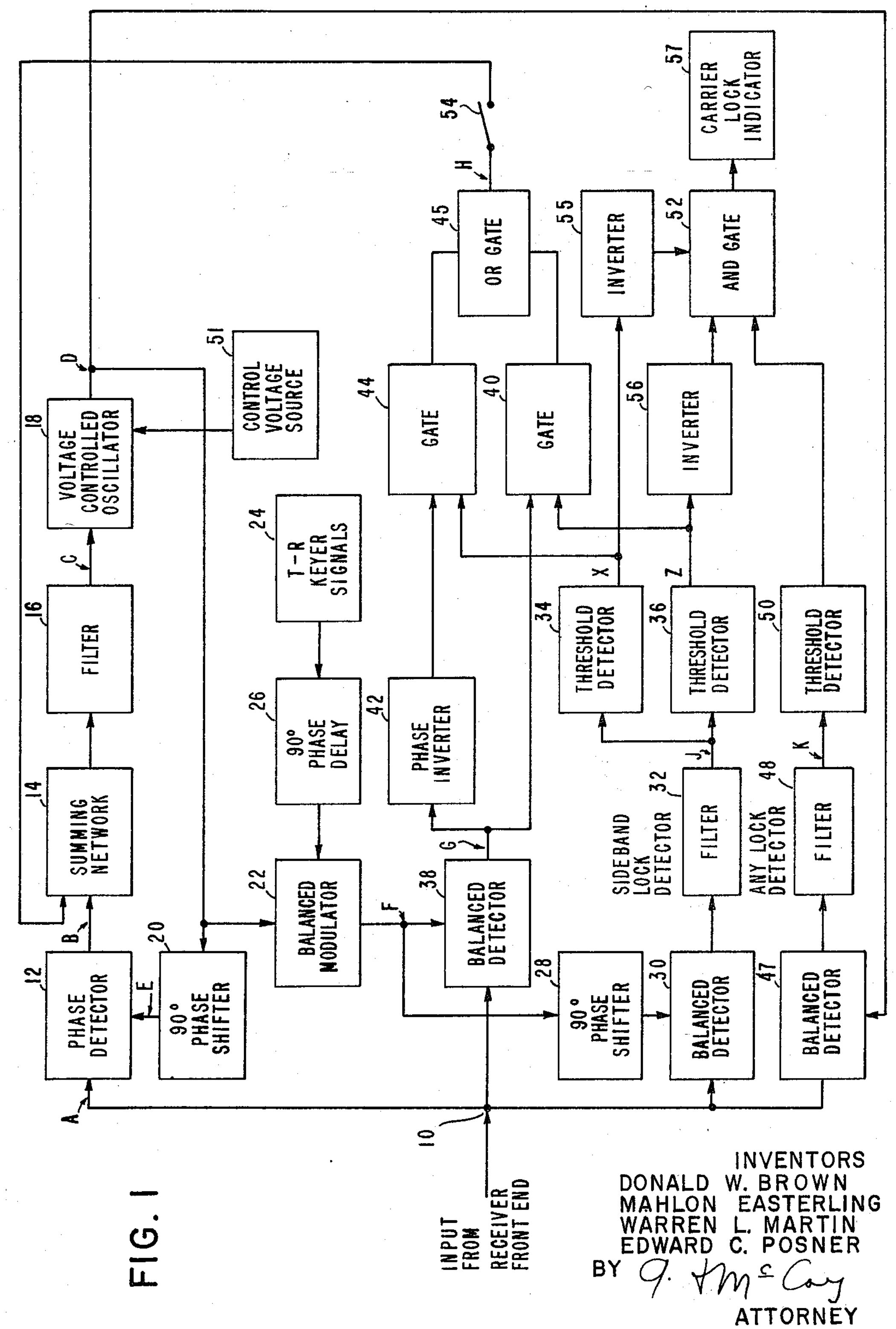

This invention relates to continuous wave tracking radar systems which use the same antenna for transmitting and receiving, and more particularly to improvements therein.

Continuous wave radar systems of the type with which this invention is concerned employ one antenna for transmitting as well as for receiving. In operation, a continuous wave signal is keyed on and off at the transmitter. The receiver is gated off when the signal is being transmitted and then is gated on to receive the signal. By a suitable choice of a switching rate and the bandwidth of a phase-locked loop receiver, a system can be designed so that the receiver will track in frequency during the intermittent period; when the signal is absent (i.e., during the transmit period). To enable this, however, it is required that the nearest sidebands produced by the interruption of the transmitted signal fall outside the tracking bandwidth of the receiver.

The most efficient time-sharing scheme in the sense of producing a maximum available carrier at the receiver for a given peak power from the transmitter is to share the antenna equally between the transmitter and receiver. This can be done by transmitting for a time T equal to the time necessary for the signal to propagate to the target and back, and then receiving for an equal time. If the target is far enough away that this switching rate would produce sidebands too close to the carrier (low switching rate), the sidebands can be moved away by using any odd integral fraction of T for the transmit and receive period. Since the keying waveform is square (i.e., a 50% duty cycle), only the odd numbered sidebands will be present and need be considered.

Of course, the more rapidly the switching is done, the easier it is for the receiver to track through the periods when the signal is absent (i.e., the transmit periods). However, it is difficult to turn a high-powered transmitter on and off at a high rate, especially while maintaining phase coherence with the transmitted carrier signal. Ordinarily, some compromise switching rate must be sought between that desired for receiver operation and that permitted by transmitter design. Even when such a compromise is achieved, there still remains the problem produced by the presence of sidebands in the received signal. If the RF phase-locked loop in the receiver locks to one of these sidebands instead of to the carrier, then erroneous tracking will result. It can be shown that when a carrier is turned on and off by a square wave with a 50% duty cycle, the first sidebands are down from the carrier by only about 4 db relative to the carrier, the third sideband is about 13½ db, etc. This constitutes the problem which is present with these types of radar systems. Since the power of the sideband is not very far below that of the carrier, a sideband lock is quite probable. If a receiver locks to the sideband instead of to the carrier, then the two-day doppler measurement is in error and the ranging modulation cannot be properly detected.

An object of this invention is to provide a radar system of the general type described wherein locking on sidebands is prevented.

Yet another object of the present invention is the provision of a radar system of the type described wherein the receiver automatically locks onto the carrier signal.

Still another object of the present invention is the provision of a novel and useful phase-lock loop arrangement with the ability to reject the sideband and to lock onto the carrier instead.

These and other objects of the present invention may be achieved in a radar system wherein the received interrupted continuous wave signal is detected and then multiplied by the keying waveform, delayed 90°. The integral of the resulting signal over a period of time turns out to be substantially zero if the received signal is the carrier, and is other than zero if the received signal is a sideband. This is then detected and used for breaking the lock on the sideband signal, whereby the receiver is then enabled to lock to the carrier signal.

Figure 2:
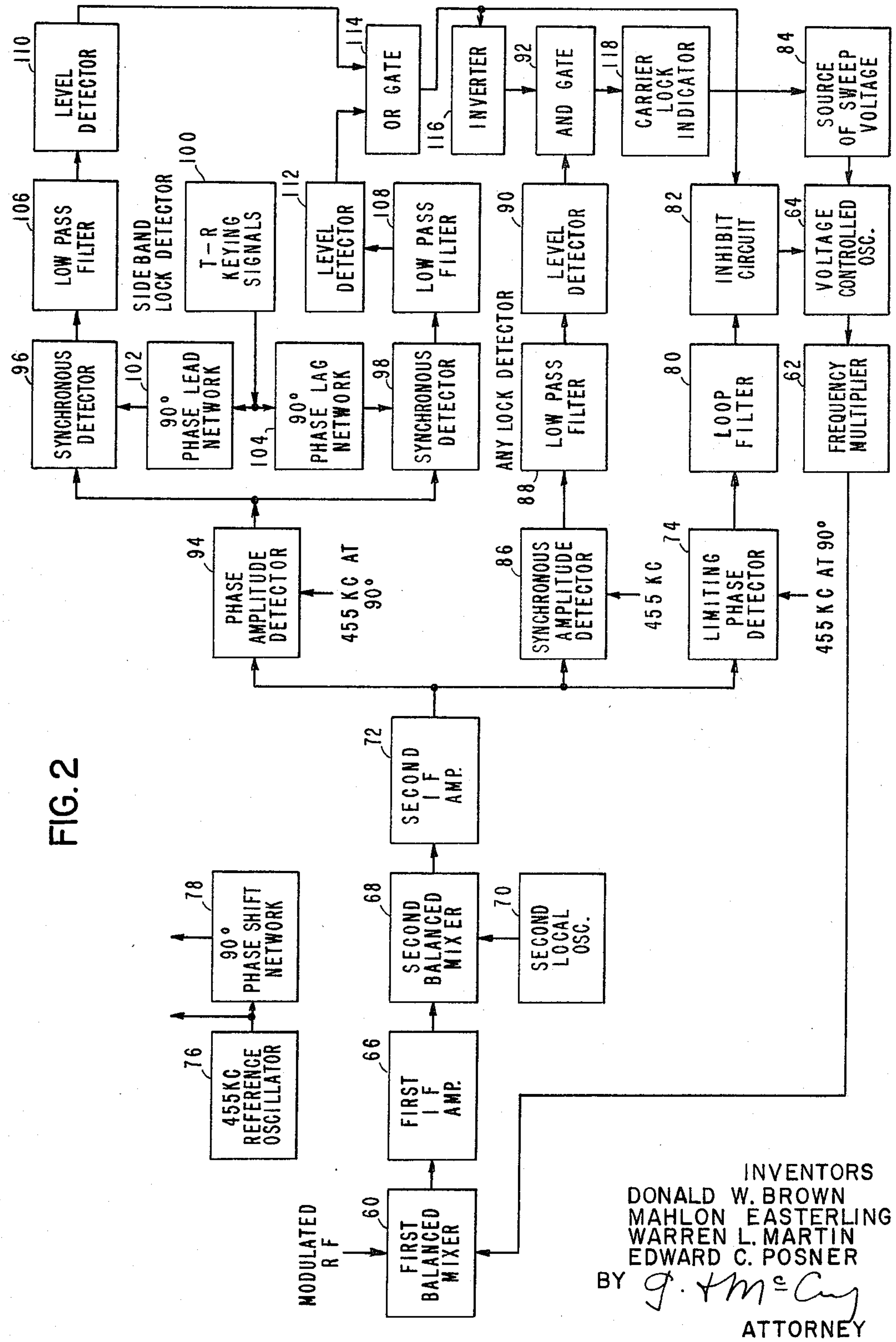

The novel features that are considered characteristic of this invention are set forth with particularity in the appended claims. The invention itself both as to its organization and method of operation, as well as additional objects and advantages thereof, will best be understood from the following description when read in connection with the accompanying drawings, in which:

FIGURE 1 is a block diagram of an embodiment of the invention using a cancelling voltage, and FIGURE 2 is a block diagram of an embodiment of the invention using an inhibit circuit.

One approach to the sideband locking problem has been to attempt to suppress the sidebands relative to the carrier by controlling the switching by a pseudo-random sequence instead of by a square wave. This leads to complications and difficulties because of the dynamic range of the signal caused by the ranges and target sizes encountered. Upon further investigation, it has been found that the use of pseudo-random switching aggravates rather than improves the problem, and furthermore, it reduces the power available to the receiver. In accordance with this invention, square wave control switching is employed. The tracking performance of the receiver is not degraded, and, the receiver does not lock onto a sideband, but rather on the carrier.

For an understanding of the theory of operation of this invention, consider a waveform of plus or minus one which is 90° out of phase with the rectangular transmitter-receiver keying waveform. If the signal received is detected and then multiplied by this 90° out of phase waveform, and the resulting function integrated from zero to T (T is the round trip time to the target), the integral is zero for the carrier, however, every sideband will give a nonzero integral.

To be specific, consider a Fourier component of the incoming waveform: $\cos[(f_0+Nf_K)t]$, where $f_0$ is the carrier frequency in cycles per second, $f_K$ the keying frequency in cycles per second. Thus $f_K=1/2T$. The index N is 0 for the carrier, and odd for all sidebands.

To carry out the integration indicated in the above paragraph, the sums of the integrals indicated below must be evaluated. Assume that the carrier has been removed.

$$\int_{0=t}^{\frac{T}{2}} \cos\frac{N\pi t}{T}dt-\int_{t=\frac{T}{2}}^{T} \cos\frac{N\pi t}{T}dt= \begin{cases} 0;\ N=0 \\ \frac{4T}{N}(-1)^{\frac{N-1}{2}};\ N\text{odd} \end{cases} \quad (1)$$

The property of the sidebands expressed in (1) will enable the carrier to be distinguished from the sidebands.

A system utilizing this distinguishing feature would by other means detect the condition of lock, and decide whether the lock were on a carrier or sideband by evaluating the nitegral (1). If the integral is non-zero, meaning that the loop is locked to a sideband, one of several means of disabling the loop would allow it to move to the next lock encountered. Various methods for breaking the lock include, but are not restricted to, application of a cancelling voltage; shorting, opening, or otherwise disabling the loop.

Referring to the drawings, FIGURE 1 is a block diagram of an embodiment of this invention which uses a cancelling voltage to prevent sideband lock. The input from the receiver front end, which may correspond to the output from one of the intermediate frequency amplifiers, is applied to a junction 10 which is connected to a phase-locked loop. The phase-locked loop includes a phase detector circuit 12, the output of which is applied to a summing network 14. The output of the summing network is applied to a filter 16. The output of the filter is connected to a voltage controlled oscillator 18. The output of the voltage controlled oscillator is applied to a 90° phase detector. Aside from the presence of the summing network 14 to which a cancelling voltage is applied in a manner to be described, it will be recognized that the phase-locked loop is of the conventional type. It functions conventionally also. The summing network 14 functions, as will be described in more detail below, to cancel the lock of the loop on a sideband upon the receipt of a suitable signal, so that the phase-locked loop can be then moved toward a locking operation with the carrier signal.

The output of the voltage controlled oscillator 18 is also applied to a balanced modulator 22 which operates to multiply this signal with the output from the transmitter keyer delayed in phase by 90°. The latter input to the balanced modulator 22 comprises a signal from the transmitter keyer signal source 24 which is applied to a phase delay network 26, the output of which is applied to the second input of the balanced modulator 22.

The output of the balanced modulator 22 is applied to a sideband lock detector circuit. This comprises a 90° phase shift circuit 28 which receives the output of the balanced modulator 22. The phase shifted output is applied as a first input to a balanced detector 30, the second input to which is the signal from the junction 10. The output of the balanced detector 30 is applied to a filter 32. As will be shown later, the result of the detection function by the balanced detector 30 is positive, when the loop is locked on remaining sidebands. Accordingly, one threshold detector 36 provides an output signal when the signal passing through the filter 32 is positive, and the other threshold detector 34 provides an output signal when the output received from the filter 32 is negative. When the receiver is locked on the carrier, the output of the filter 32 is substantially zero and therefore no signal is obtained from the output of the threshold detectors 34, 36. To disable a sideband lock, a cancelling voltage is applied to the summing network 14. This is derived from the output of the balanced detector 38 which receives as one input the output of the balanced modulator 22 and another input from the junction 10. Since the cancelling signal applied to the summing network may or may not require a phase inversion, depending upon which of the sidebands there is a lock, the output of the balanced detector is applied directly to a gate 40 and also to a phase inverter 42 whose output is applied to another gate 44. As will be subsequently shown herein, when the sideband lock detector provides a positive signal output (+1) from the threshold detector 36, no phase inversion is required and when the sideband lock detector provides a negative output (−1) then a phase inversion is required. The threshold detector 34, which provides the negative indication, enables gate 44 to apply an inverted output through an Or gate 45 and a switch 54 to the summing network 14, and the positive threshold detector 36 enables gate 40 to apply a noninverted output through the Or gate 45 and switch 54 to the summing network 14. When the phase-locked loop has locked on the carrier, then neither threshold detectors respectively 34, 36, will provide an output, whereupon the gates 40, 44 are disenabled.

An "any lock" detector circuit is provided. This circuit produces an output when the phase-locked loop is locked to either the carrier or a sideband. It comprises a balanced detector 46 which receives an output from the voltage controlled oscillator 18 and also an output from the junction 10. The signal which is detected from the two inputs is applied to a filter 48 and then applied to a threshold detector 50. As will be subsequently shown herein, the balanced detector 46 produces an output in the presence of a lock, either sideband or carrier; therefore the threshold detector 50 will also provide an output in the presence of any such locks. The output of the threshold detector 50 is applied to an And gate 52. Another required input is that from inverters 55, 56 when there is no "sideband lock" signal applied to their input. Thus, And gate 52 output, indicative of a carrier lock, is applied to a "carrier lock indicator" 57 which can be a light, for example, indicating this.

To analyze the system's operation, consider first the phase-locked loop consisting of the phase detector 12, filter 16, voltage controlled oscillator 18, and phase shifter 20. If the input to the phase detector (point A) is $v_A = a \cos f_0 t$, $0 \leq t \leq T$; and $=0$, $T \leq t \leq 2T$, then the output from the VC0 (point D), when the loop is locked to a frequency component indexed by N, is $$v_D = \cos[(f_0 + Nf_K)t + \theta(N) + \epsilon] \quad (2)$$

The angle $\theta(N)$, the phase angle between the VCO output and the input taken as a reference, can be shown to be 0 for carrier lock, $-\pi/2$ for upper sidebands, and $+\pi/2$ a small phase error term.

The phase shifter 20 adds another 90° phase shift. The second input to the phase detector (point E) is therefore given by equation $$v_E = \cos[(f_0 + Nf_K)t + \theta(N) + \pi/2 + \epsilon] \quad (3)$$

A multiplicative operation takes place in the phase detector 12; such that its output (point B) becomes, $$v_B = a/2 \cos[Nf_K t + \theta(N) + \pi/2 + \epsilon],\ 0 \leq t < T;\ =0 \text{ otherwise} \quad (4)$$

Filtering within the detector removes the double frequency resulting from the multiplicative operation. This equation may be rewritten as follows $$\begin{aligned} v_B &= -a/2 \sin \epsilon,\ N=0,\ 0 \leq t < T \\ &= a/2 \cos(Nf_K + \epsilon),\ N>0,\ 0 \leq t < T \\ &= -a/2 \cos(Nf_K t + \epsilon),\ N<0,\ 0 \leq t < T \\ &= 0,\ T \leq t < 2T,\ \text{all } N \end{aligned} \quad (5)$$

Equations (5) are expressions for the time varying signal to be found at the output of the phase detector 12 for any condition of lock. The average value $V_B$ of $v_b$ taken over a round trip time 2T is found by integrating Equation (5) from 0 to 2T and dividing by 2T. This yields:

$$\begin{aligned} V_B &= -a/4 \sin \epsilon,\ N=0 \\ &= -a/2N \sin \epsilon,\ N>0 \\ &= a/2N\pi \sin \epsilon,\ N<0 \end{aligned} \quad (6)$$

Equations (6) yield the effective error voltage in the phase-locked loop.

Now consider the operation of the cancelling voltage source, consisting of the balanced modulator 22, detector 38, polarity selector (gates 44, 40), and summing network 14. The functioning of this subsystem as well as the lock detectors is contingent upon the availability of a keying signal which has been shifted 90°. This does not increase the restrictions because the basic operation of time sharing the antenna between transmission and reception requires a closely estimated round trip propagation time, and hence requires a properly phased keying signal. This delayed keying signal modulates the VCO output, $v_D$, via the balanced modulator 22. The modulator is designed so that its output (point F) is given by equation:

$$v_F=\cos\ [(f_0+Nf_K)t+\theta(N)+\epsilon],\ 0\leq t<T/2;\ 3T/2\leq t<2T \quad (7)$$
$$=-\cos\ [(f_0+Nf_K)t+\theta(N)+\epsilon],\ T/2\leq t<3T/2$$

The signal $v_F$ is phase detected with the incoming signal; the output of the cancelling voltage source balanced detector (point G) is given as $$v_G=a/2\cos\ (Nf_Kt+\theta(N)+\epsilon),\ 0\leq t<T/2 \quad (8)$$
$$=-a/2\cos\ (Nf_Kt+\theta(N)+\epsilon),\ T/2\leq t<T$$
$$=0,\ T\leq t<2T$$

The average value of $v_G$ must be known from $t=0$ to $t=2T$, since $V_G$ will form the average cancelling voltage. This average is obtained in the following equation by integrating equation (8)

$$V_G=0,\ N=0; \quad (9)$$
$$=-a/2N\pi(-1)N+1/2\sin\epsilon,\ N\neq 0.$$

The average voltage $V_G$ obtained from Equation 9 should be compared with the average voltage $V_B$ from Equation 6. When $N\neq 0$, corresponding to sideband lock, we see that $V_G=\pm V_B$. When $N=0$, corresponding to carrier lock, the cancelling voltage source is not used. If it were used, the cancelling voltage $V_G$ would be 0 anyway; so it would have no effect. The minus sign is required for $N=-9, -5, -1, +3, +7, \ldots$, the plus sign for $N=-11, -7, -3, +1, +5, +9, \ldots$ Thus the sign reverses when changing from a sideband to the adjacent or lower sideband.

The problem reduces to one of putting the proper sign in front $v_G$ so that $\pm V_G$ will exactly cancel $V_B$. The actual sign reversal is made by passing $v_G$ through a phase inverter 42 with unit gain. The polarity selecting gates select $\pm V_g$ and the output appears at point H. The decision as to whether to reverse the sign of $v_G$ is made by the sideband lock detector.

The cancelling voltage (point H) contains noise as well as the desired signal. This extra noise causes degradation of the system performance by adding 3 db more noise to the phase-locked loop. For very small echoes, this increase might be intolerable. Therefore, a switch 54 is inserted between the gates 40, 44 and the summing network 14. This switch should be left open until the first sideband lock has been detected. With this switch open, the system operates as a conventional phase-locked loop, and no threshold degredation will occur. As mentioned previously, the first sidebands are about 4 db below the carrier. Thus the switch 54 can be left closed after a sideband lock has been detected, and the carrier will not be masked.

Finally, to make the device operative, a method must be described by which the proper polarity of $v_G$ is selected for sideband rejection. The output of the sideband lock detector circuits is zero for carrier lock, but not for sideband lock. The sideband lock detector is composed of the phase shifter 28, a phase detector 30, a low-pass filter 32, and the two threshold detectors 34, 36. The output at F of the balanced modulator 22 is phase shifted 90°. Thus, the average output $V_J$ (at point J), over a time 2T, of the sideband lock detector is given by $$V_J=\begin{cases}0,\ N=0\\ \frac{+a}{2N\pi}\left[(-1)\frac{N-1}{2}\cos\epsilon-\sin\epsilon\right],\ N>0\\ \frac{-a}{2N\pi}\left[(-1)\frac{N-1}{1}\cos\epsilon-\sin\epsilon\right],\ N<0\end{cases} \quad (10)$$

The derivation of Equation 10 is similar to the derivation of other average voltage equations, and is consequently omitted. The two threshold detectors respectively 34, 36 must be able to detect whether $V_J$ is positive, negative, or 0, for the largest N possible. This largest N is determined by the largest possible frequency uncertainty in the received carrier. Since $\epsilon$ is small, we may approximate $V_J$ by $V_J$ where $$V_J\begin{cases}0,\ N=0\\ \frac{-a}{2N\pi}(-1)\frac{N+1}{2},\ N>0\\ \frac{+a}{2N\pi}(-1)\frac{N+1}{2},\ N<0\end{cases} \quad (11)$$

It has been assumed that the loop VCO is sweeping upward, although this is an arbitrary choice, so that $N<0$. Thus $V_J$ is negative for $N=-1, -5, -9, \ldots$; these are precisely the values of N requiring sign reversal in $v_G$, as observed in the discussion following Equation 9. Thus a voltage appears at X and enables gate 44 whenever a phase inversion is required in the cancelling voltage source. A corresponding voltage appears at Z and enables gate 40 whenever no phase inversion is required in the cancelling voltage.

Since the output from the sideband lock detector is zero in the carrier locked state, the any lock detector is required to provide evidence of this condition. This detector provides a single output for all conditions of lock, carrier or sideband. The any lock detector consists of a phase-sensitive amplitude detector 46 (with inputs from the received signal and from the VCO output), a low-pass filter 48, and a positive threshold detector 50. The average voltage over the time interval [0, 2T] of the voltage at point K, is given by Equation 12.

$$V_k=a/4\cos\epsilon(\approx a/4);\ N=0$$
$$=\frac{a}{4N\pi}[1+\cos\epsilon]\left(\approx\frac{a}{2N\pi}\right)N>0$$
$$=-\frac{a}{4N\pi}[1+\cos\epsilon]\left(\approx-\frac{a}{2N\pi}\right)N<0 \quad (12)$$

Thus, $V_K$ is positive for all conditions of lock. The output of the any lock detector Y together with the inverted outputs of the sideband lock detectors X, Z can be combined in gate 52 to indicate the presence of a carrier lock.

The operation of the system may be summarized by the Truth Table provided below.

LOCK DETECTOR TRUTH TABLE

| Sideband lock detector | "Any lock" detector | Indicated lock condition | Polarity reversal required? |
|---|---|---|---|
| 0 | 0 | None | |
| 0 | +1 | Carrier | No |
| +1 | +1 | $U_j+L_i$ | No |
| −1 | +1 | $U_i+L_j$ | Yes |

U represents upper sidebands
L represents lower sidebands
$\left.\begin{array}{l}i=4k-1\\ j=4k-3\end{array}\right\}$ for $k=1, 2, 3 \ldots, n$ In the above table, U represents upper sidebands and L the lower. The subscripts $i$ and $j$, defined respectively by $i=4k-1$
$j=4k-3$ where $k$ is any positive integer 1, 2, 3, . . . $n$ denote two groups of sidebands. For example, the third sideband is a member of group $i$ since $$i=4\times 1-1=3$$

but the fifth is a member of group $j$ $$j=4\times 2-3=5$$

Using the numerical values for these subscripts, $U_i$ and $L_j$ denote the couple set of sidebands for which polarity inversion is required. From the above sample calculations, it will be seen that the third upper and fifth lower sidebands are members of this group.

Considering now a typical ranging operation. To start, the switch 54 in the cancelling voltage source is open to prevent degradation of receiver threshold as explained earlier. Next, the VCO frequency is offset from the transmitted carrier by the control voltage source signal. This offset must be sufficiently great so that the VCO passes the received signal frequency as it sweeps back toward the carrier. The direction of sweep is completely arbitrary and does not affect the operation of the device. Selection is determined by the optimal search procedure which is a function of the target's characteristics. Suppose, for example, that the frequency of the VCO has been decreased beyond the ninth ($N=-9$) lower sideband. The VCO frequency is then gradually raised back toward the transmitted carrier frequency by applying a slowly increasing control voltage to the VCO from the control voltage source 51 until lock occurs. If the fifth lower sideband is the first sideband reached above receiver threshold, the first lock will be on this fifth lower sideband. For $N=-5$, it is found from the table that a reversal in the sign of $v_G$ is required. Gate 44 is enabled and the cancelling voltage $-v_G$ is injected into the summing network in the phase-locked loop. Since $$V_G+V_B=0$$

for this case, the lock is broken. (In fact, the 3 db extra noise added when the switch 54 is closed could break the lock first.) Once lock has been broken, the control voltage which had continued its sweep, causes the VCO to begin moving upward once more. When the third lower sideband is reached, the positive threshold detector 36 provides an output enabling gate 40. At this time, a non-inverted $v_G$ is applied and the lock is broken as before. The system moves on to first order lock, and finally reaches the carrier. Block 50 output $=+1$ indicating lock, but sideband lock detector outputs 34, 36 $=0$ indicating a carrier lock. Note that the cancelling voltage source average output $V_G$ for the case $N=0$ is 0, so that the only effect of the cancelling voltage source is to add 3 db more noise. But as mentioned, carrier lock will not be broken because of this noise. The output of And gate 52 indicates a carrier lock. This output can be used to open switch 54 and the loop now operates as an ordinary phase-locked loop locked to the receiver carrier.

The sideband lock rejection system described is optimal to the following sense: no degradation in the overall system performance is introduced by the device. For reasons previously stated, there will be no loss in threshold sensitivity. Furthermore, after acquisition of carrier lock, the loop operates as a conventional phase-locked loop. The question of optimality reduces to the effect of sideband rejection on acquisition time. The acquisition time is a function of received signal strength, loop bandwidth, and maximum doppler frequency uncertainty in the receiver carrier frequency. Analysis indicates a substantial improvement can be expected by utilizing this system.

FIGURE 2 is a block diagram of an alternate arrangement for a radar receiver to avoid spurious sideband lock condition. This method, in effect, opens a switch to break the sideband lock, instead of using a cancelling voltage. The remainder of the receiver is essentially the same. The arrangement shown substantially incorporates the invention which is shown and described in FIGURE 1. The modulated radio frequency carrier, which is received by the antenna when the receiver is keyed on and the transmitter is keyed off, is applied to a first balanced mixer 60. The other input of the first balanced mixer is received from a frequency multiplier 62. The frequency multiplier receives the output of the voltage controlled oscillator 64. Accordingly, the output of the first balanced mixer will be the first intermediate frequency which is applied to the first IF amplifier 66.

The output of the first IF amplifier is applied to a second balanced mixer 68. There it is mixed with the output of a second local oscillator 70 in order to provide a second IF frequency. The second IF frequency is applied to a second IF amplifier 72. The output of the second IF amplifier is then applied to the voltage controlled oscillator loop and to the any lock detector network and sideband lock detector network.

Completing the phase-locked loop, the output of the second IF amplifier 72 is applied to a limiting phase detector 74 which receives as its other input the output of a 455 kc. reference oscillator which has been shifted 90°. This oscillator is represented by the rectangle 76 and its output is supplied to a 90° phase shift network 78 to produce the required input to the limiting phase detector 74. The output of the limiting phase detector which is the phase difference between the received second IF and the 455 kc. signal is applied to the loop filter 80. The output of the loop filter is applied to an inhibit circuit 82. The function of the inhibit circuit is to short circuit the loop when a signal is received from the sideband lock detector network indicative of the fact that the loop is locked on a sideband. This breaks the loop so that the voltage controlled oscillator can then proceed to search for the carrier signal. Otherwise, the inhibit circuit has no effect on the phase-locked loop. The inhibit circuit output is applied to the voltage controlled oscillator 64. The source of an acquisition voltage 84 is employed initially in order to facilitate acquisition. This comprises a ramp or sweep voltage which causes the voltage controlled oscillator to be swept in the manner previously described in a direction from the one side of the carrier through sidebands down to the carrier with the voltage controlled oscillator loop being shorted each time the receiver locks on a sideband. During this detection and shorting, the sweep voltage continues moving toward the carrier. As in the system of FIGURE 1, when the carrier has been acquired, the source of sweep voltage 84 is disabled.

The any lock detector is identical in structure with the one which was described in connection with FIGURE 1. The output of the second IF amplifier is applied to a synchronous amplitude detector 86 to which there is also applied the 455 kc. output of the reference oscillator 76. The output of the synchronous amplitude detector is then applied to a low-pass filter 88 and thereafter to the level detector 90. If the output received by the level detector is positive, then it is known that the voltage controlled oscillator has locked on either a sideband or on the carrier. The output of the level detector, which occurs only in the presence of its positive input signal, is applied as one input to an And gate 92.

The output of the second IF amplifier 72 is also applied to the sideband lock detector which is substantially identical with that shown and described in FIGURE 1. Thus, a 455 kc. signal shifted 90°, which is the output of the network 78, is applied to a phase amplitude detector 94 as one input. The second input of this phase amplitude detector is the output of the second IF amplifier 72. The output of the phase amplitude detector is applied to two synchornous detectors respectively 96, 98. The second input to these two synchronous detectors comprises a transmitter, receiver keying signal which has been shifted 90°. Thus, rectangle 100, referred to as, and representing the source of transmitter-receiver keying signals, applies its output to a 90° phase lead network 102, the output of which is the second input to the synchronous detector 96, and to a 90° phase lag network 104, the output of which is the second input to the synchronous detector 98.

There will be an output from synchronous detector 96 when the VCO loop has locked on the 11th, 7th, 3rd lower sidebands, or 1st, 5th, or 9th upper sidebands. When the phase-locked loop has locked on a 9th, 5th or 1st lower sideband or the 7th and 3rd upper sideband, there is an output from synchronous detector 96. The respective synchornous detector outputs 96, 98, are respectively applied to low-pass filters respectively 106, 108. The output of the low-pass filters are applied to level detectors respectively 110, 112. These level detectors provide an output in the presence of an input. The output of the respective level detectors 110, 112 is supplied to an Or gate 114, which functions to provide an output in the presence of either of its inputs.

The output of the Or gate 114, when present causes the inhibit circuit 82 to short the phase-locked loop and thereby break the lock so that the voltage controlled oscillator can revert to control of the continuous sweep voltage source 84 to move toward acquisition of the carrier. The output of the Or gate 114 is also applied to an inverter 116. Thus, in the presence of an output of Or gate 114, inverter 116 operates to inhibit the And gate 92. In the absence of an output from Or gate 114, the inverter 116 permits And gate 92 to pass the output of the level detector 90, to a carrier lock indicator 118. The carrier lock indicator indicates that the VCO phase-locked loop is locked on the carrier. The output of the carrier lock indicator can also be applied to the source of the sweep voltage 84 for the purpose of terminating its further operation in view of acquisition by the carrier.

There has accordingly been described and shown herein a novel, useful and unique arrangement for a radar system of the type described wherein the phase-locked loop which is employed in the receiver is directed to lock on to the carrier.

What is claimed is:

1. In a system wherein a transmitter and receiver are alternately keyed on and off with a keying signal, said transmitter transmitting an interrupted carrier wave and sidebands in response to said keying signals, said receiver receiving reflection signals of said interrupted carrier wave and sidebands from a target, said receiver including a phase-locked loop having a voltage controlled oscillator, the improvement comprising means for detecting when said phase-locked loop has locked in phase with a sideband signal and producing a "sideband lock" signal indicative thereof, means responsive to said "sideband lock" signal for unlocking said phase-locked loop from the phase of said sideband signal, means for detecting when said phase-locked loop has locked to the phase of any of said received signals and producing an "any lock" signal indicative thereof, and means responsive to the presence of said "any lock" signal and the absence of said "sideband lock" signal for indicating that said phase-locked loop has locked in phase with said carrier.

2. In a system wherein a transmitter and receiver are alternately keyed on and off with a keying signal, said transmitter in response to said keying signal transmitting an interrupted carrier wave and sidebands, said receiver receiving reflections of said interrupted carrier wave and sidebands from a target and including a phase-locked loop having a voltage controlled oscillator, the improvement comprising control voltage means for urging said voltage controlled oscillator through a range of frequencies from one side of said carrier wave frequency to said carrier wave frequency to enable said phase-locked loop to lock in phase with a sideband encountered in said range of frequencies, means for detecting that said phase-locked loop has locked in phase with a sideband, means rendered operative responsive to said means for detecting that said phase-locked loop has locked in phase with a sideband to unlock said loop to allow further control by said control voltage means, and means for sensing when said phase-locked loop has locked in phase with said carrier and not in phase with a sideband to terminate operation of said control voltage means.

3. In a system as recited in claim 2 wherein said means for detecting that said phase-locked loop has locked in phase with a sideband comprises means for shifting said keying signal 90° in phase, means for multiplying signals from said phase-locked loop with said phase shifted keying signals, and means connected to said phase-locked loop and to the output of said means for multiplying to produce a signal which has a value other than zero when said phase-locked loop is locked in phase with a sideband.

4. In a system wherein a transmitter and receiver are alternately keyed on and off with a keying signal, said transmitter in response to said keying signal transmitting an interrupted carrier wave and sidebands, said receiver receiving reflections of said interrupted carrier wave and sideband signals from a target, said receiver including a phase-locked loop having a voltage controlled oscillator, the improvement comprising control voltages means for urging said voltage controlled oscillator through a range of frequencies from one side of said carrier wave frequency to said carrier wave frequency to enable said phase-locked loop to lock in phase to a sideband encountered in said range of frequencies, summing network means connected in said phase-locked loop, for unlocking said loop in the presence of a cancelling voltage, means for generating said cancelling voltage, means coupled to said phase-locked loop for detecting that it is locked to the phase of a sideband signal and producing a sideband lock indicating signal, and means responsive to said sideband lock indicating signal for applying said unlocking signal to said summing network for unlocking said phase-locked loop from the phase of said sideband, and to enable it to respond to said control voltage means.

5. In a system wherein a transmitter and receiver are alternately keyed on and off with a keying signal, said transmitter transmitting an interrupted carrier wave and sidebands in response to said keying signal, said receiver receiving reflections of said interrupted carrier wave and sidebands from a target, said receiver further including a phase-locked loop having a voltage controlled oscillator, the improvement comprising control voltage means for urging said voltage controlled oscillator through a range of frequencies from one side of said carrier wave frequency to said carrier wave frequency to enable said phase-locked loop to lock onto a sideband encountered in said range of frequencies, means coupled to said phase-locked loop for detecting that said said phase-locked loop has locked in phase with a sideband and producing a "sideband lock" signal indicative thereof, means coupled to said phase-locked loop for generating a first unlocking signal having one polarity and a second unlocking signal having an opposite polarity, means responsive to said "sideband lock" signal for applying a proper one of said first and second signals to said phase-locked loop to unlock said phase-locked loop from the phase of said sideband to allow further control by said control voltage means, means for detecting when said phase-locked loop is locked loop is locked to any received signal and producing an "any lock" signal indicative thereof, and means responsive to the absence of a "sideband lock" signal and the presence of an "any lock" signal to indicate that said phase-locked loop has locked in phase to a carrier signal.

6. In a system as recited in claim 4 wherein said means for generating a first unlocking signal for said phase-locked loop and a second unlocking signal of opposite polarity to said first signal comprises means for shifting said keying signals by 90°, balanced modulator means having a first input connected to said phase-locked loop and a second input connected to said means for shifting said keying signals 90°, balanced detector means having a first input connected to said balanced modulator means output and a second input coupled to said phase-locked loop whereby said balanced detector output comprises said first signals, and phase inversion means to which said balanced detector output is applied for producing said second signals.

7. In a system wherein a transmitter and receiver are alternatively keyed on and off with a keying signal, said transmitter in response to said keying signal transmitting an interrupted carried wave and sidebands, said receiver receiving reflections of said interrupted carrier wave and sideband signals from a target, said receiver including a phase-locked loop to which said received signals are applied and having a voltage controlled oscillator, the improvement comprising control means for urging said voltage controlled oscillator through a range of freqeuncies from one side of said carrier wave frequency to said carrier wave frequency to enable said phase-locked loop to lock in phase to a sideband encountered in said range of freqeuncies, summing network means in said phase-locked loop for unlocking said phase-locked loop in response to an unlocking signal, means for shifting the phase of said keying signals substantially 90°, balanced modulator means for modulating the output of said phase-locked loop with said phase-shifted keying signals, balanced detector means coupled to the output of said balanced modulator means for producing a first unlocking signal to said phase-locked loop, means to which said unlocking signal is applied for producing a second unlocking signal having a polarity opposite to said first unlocking signal, a second 90° phase-shift means connected to receive the output of said balanced modulator means, second balanced detector means coupled to said phase-locked loop and to the output of said second 90° phase-shift means are applied for producing a sideband lock indicating signal when said phase-locked loop is locked in phase with a sideband, said sideband lock indicating signal having a polarity determined by the one of the sidebands to which said phase-locked loop is locked, and means responsive to a sideband lock signal for applying one of said first and second unlocking signals to said summing network to unlock said phase-locked loop from the phase of said sideband signal to allow further control by said control voltage means.

8. In a system as recited in claim 7 wherein there is provided a third balanced detector means for producing at its output an "any lock" signal responsive to the output of said voltage controlled oscillator and said signals being applied to said phase-locked loop indicative of the fact that said phase-locked loop is locked on a signal, and means for producing an output indicative of the fact that said phase-locked loop is locked on said carrier in the presence of said any lock signal and the absence of said sideband lock indicating signal.

9. In a system wherein a transmitter and receiver are alternatively keyed on and off with a keying signal, said transmitter in response to said keying signal transmitting an interrupted carrier wave and sidebands, said receiver receiving reflections of said interrupted carrier wave and sidebands from a target, said receiver including a phase-locked loop having a voltage controlled oscillator, the improvement comprising means for unlocking said phase-locked loop from a phase lock with a sideband in response to an unlocking signal, control voltage means for urging said voltage controlled oscillator through a range of frequencies from one side of said carrier wave frequency to said carrier wave frequency to enable said phase-locked loop to lock in phase with a sideband encountered in said range of frequencies, means for detecting that said phase-locked loop is locked in phase with a sideband and producing an unlocking signal responsive thereto, means for applying said unlocking signal to said means for unlocking said phase-locked loop to render it operative, means for detecting when said phase-locked loop has locked in phase with any one of said received signals and producing an "any lock" signal, and means responsive to the presence of an "any lock" signal and the absence of an unlocking signal for rendering said control voltage means inoperative.

10. In a system as recited in claim 9 wherein said means for detecting that said phase-locked loop is locked in phase with a sideband and producing an unlocking signal in response thereto includes a source of reference oscillations, first 90° phase shifting means for shifting the phase of said source of reference oscillations 90°, phase amplitude detecting means to which output from said phase-locked loop and said first 90° phase shifting means is applied for producing an output having the amplitude and phase of said phase-locked loop output relative to said 90° phase shifting means output, second 90° phase shifting means to which said keying signal is applied for being shifted 90°, and synchronous detector means for producing an unlocking signal in response to the output of said second 90° phase shifting means and the output of said phase amplitude detecting means when said phase-locked loop is locked in phase with a sideband.

11. In a system as recited in claim 10 wherein said means for detecting when said phase-locked loop has locked in phase with one of said received signals comprises detecting means to which is applied the output of said phase-locked loop output from said reference oscillator for producing a signal indicative of a lock on any carrier.

12. In a system wherein a transmitter and receiver are alternatively keyed on and off with a keying signal, said transmitter in response to said keying signal transmitting an interrupted carrier wave and sidebands, said receiver receiving reflections of said interrupted carrier wave and sidebands from a target, said receiver including a phase-locked loop having a voltage controlled oscillator and a limiting phase detector to which oscillations at a reference frequency are applied, the improvement comprising control voltage means for urging said voltage controlled oscillator through a range of frequencies from one side of said carrier wave frequency through said carrier wave frequency to enable said phase-locked loop to lock in phase with a sideband encountered in said range of frequencies, means for detecting that said phase-locked loop is locked on a sideband including a phase amplitude detector having a first and second input and an output, means for connecting one of said inputs to said phase-locked loop, means for applying said reference frequency oscillations to the other input, a first and second synchronous detector each having two inputs, means connecting the output of said phase amplitude detector to one of the inputs of said first and second synchronous detectors, a 90° phase leading network having an input and output, a 90° phase lagging network having an input and output, means connecting said keying signals to the inputs of said respective 90° phase leading network and 90° phase lagging network, means connecting the output of said 90° phase leading network to said first synchronous detector other input, means connecting the output of said 90° phase lagging network to the other input of said second synchronous detector means in said phase-locked loop for unlocking it from a received signal whereby it may further respond to said control voltage means, and means responsive to output from said first or second synchronous detector for activating said means for unlocking whereby said voltage controlled oscillator is restored to control by said control voltage means.

No references cited.

CHESTER L. JUSTUS, *Primary Examiner.*

J. P. MORRIS, *Assistant Examiner.*